(12) United States Patent
Hilgendorff

(10) Patent No.: US 8,950,174 B2
(45) Date of Patent: Feb. 10, 2015

(54) CATALYSTS FOR GASOLINE LEAN BURN ENGINES WITH IMPROVED $NH_3$-FORMATION ACTIVITY

(75) Inventor: Marcus Hilgendorff, Hannover (DE)

(73) Assignee: BASF SE, Ludwigshafen (DE)

( * ) Notice: Subject to any disclaimer, the term of this patent is extended or adjusted under 35 U.S.C. 154(b) by 129 days.

(21) Appl. No.: 13/224,675

(22) Filed: Sep. 2, 2011

(65) Prior Publication Data

US 2012/0055142 A1    Mar. 8, 2012

Related U.S. Application Data

(60) Provisional application No. 61/379,401, filed on Sep. 2, 2010.

(51) Int. Cl.
*F01N 3/10* (2006.01)
*B01J 23/63* (2006.01)
(Continued)

(52) U.S. Cl.
CPC ............... *B01J 23/63* (2013.01); *B01D 53/945* (2013.01); *B01J 23/58* (2013.01); *B01J 35/023* (2013.01); *B01J 37/0203* (2013.01); *B01J 37/0244* (2013.01); *B01J 37/0248* (2013.01); *B01D 53/9418* (2013.01); *B01D 53/9477* (2013.01); *B01D 2255/1021* (2013.01); *B01D 2255/1023* (2013.01); *B01D 2255/1025* (2013.01);
(Continued)

(58) Field of Classification Search
USPC ........................ 60/299, 274; 502/240–527.19;
423/213.2, 213.5; 422/177, 180, 168, 422/169, 170, 171, 179, 181, 211, 222
See application file for complete search history.

(56) References Cited

U.S. PATENT DOCUMENTS

| 4,961,917 | A | 10/1990 | Byrne |
| 5,516,497 | A | 5/1996 | Speronello et al. |

(Continued)

FOREIGN PATENT DOCUMENTS

| DE | 10011612 | 10/2000 |
| DE | 10152187 | 4/2003 |

(Continued)

OTHER PUBLICATIONS

"International Search Report and Written Opinion of PCT/IB2011/053851", mailed on Jan. 5, 2012, 13 pages.

*Primary Examiner* — Thomas Denion
*Assistant Examiner* — Kelsey Stanek
(74) *Attorney, Agent, or Firm* — Servilla Whitney LLC

(57) ABSTRACT

Described is a catalyst comprising a substrate and a catalyst coating of two or more layers: (a) a first layer comprising Pd and Rh on the substrate; and (b) a second layer comprising Pt and/or Pd on the first layer; these layers each further comprising: one or more particulate support materials; one or more oxygen storage component (OSC) materials; and one or more nitrogen oxide storage materials comprising one or more elements selected from the group of alkali and/or alkaline earth metals, wherein the total amount of alkali and alkaline earth metals ranges from 0.18 to 2.0 g/in$^3$ calculated as the respective alkali metal oxides $M_2O$ and alkaline earth metal oxides MO. Also described is a method for the production of a catalyst, as well as a process for the treatment of a gas stream, in particular of an exhaust gas stream resulting from an internal combustion engine.

19 Claims, 3 Drawing Sheets

(51) Int. Cl.
*B01D 53/94* (2006.01)
*B01J 23/58* (2006.01)
*B01J 35/02* (2006.01)
*B01J 37/02* (2006.01)
*B01J 37/00* (2006.01)
*F01N 3/035* (2006.01)
*F01N 3/08* (2006.01)
*F01N 3/20* (2006.01)

(52) U.S. Cl.
CPC ... *B01D2255/202* (2013.01); *B01D 2255/2042* (2013.01); *B01D 2255/2063* (2013.01); *B01D 2255/2065* (2013.01); *B01D 2255/2066* (2013.01); *B01D 2255/2068* (2013.01); *B01D 2255/20715* (2013.01); *B01D 2255/9025* (2013.01); *B01D 2255/908* (2013.01); *B01D 2255/91* (2013.01); *B01D 2257/404* (2013.01); *B01D 2257/502* (2013.01); *B01D 2257/702* (2013.01); *B01D 2258/012* (2013.01); *B01J 37/0036* (2013.01); *B01J 2523/00* (2013.01); *F01N 3/035* (2013.01); *F01N 3/0814* (2013.01); *F01N 3/0821* (2013.01); *F01N 3/0842* (2013.01); *F01N 3/0864* (2013.01); *F01N 3/2066* (2013.01); *F01N 2510/0684* (2013.01); *Y02T 10/22* (2013.01); *Y02T 10/24* (2013.01)

USPC ............ 60/299; 60/274; 502/339; 423/213.2

(56) References Cited

U.S. PATENT DOCUMENTS

| | | | |
|---|---|---|---|
| 6,413,904 B1 * | 7/2002 | Strehlau et al. | 502/328 |
| 7,490,464 B2 * | 2/2009 | Li et al. | 60/295 |
| 8,133,837 B2 * | 3/2012 | Yabuzaki et al. | 502/327 |
| 2008/0045405 A1 | 2/2008 | Beutel et al. | |
| 2009/0181847 A1 | 7/2009 | Yabuzaki et al. | |
| 2009/0275468 A1 * | 11/2009 | Taki et al. | 502/304 |
| 2010/0212293 A1 * | 8/2010 | Deeba et al. | 60/274 |
| 2011/0120093 A1 | 5/2011 | Eckhoff et al. | |
| 2011/0126527 A1 * | 6/2011 | Hilgendorff | 60/299 |
| 2011/0214412 A1 * | 9/2011 | Chiffey et al. | 60/274 |

FOREIGN PATENT DOCUMENTS

| | | |
|---|---|---|
| EP | 1938895 | 7/2008 |
| EP | 2112339 | 10/2009 |
| WO | WO-2004/071626 | 8/2004 |
| WO | WO-2008/022751 | 2/2008 |
| WO | WO-2008/097702 | 8/2008 |
| WO | WO-2009/134831 | 11/2009 |

* cited by examiner

CATALYSTS FOR GASOLINE LEAN BURN ENGINES WITH IMPROVED NH₃-FORMATION ACTIVITY

CROSS-REFERENCE TO RELATED APPLICATIONS

This application claims priority under 35 U.S.C. §119(e) to U.S. Provisional Application No. 61/379,401, filed Sep. 2, 2010, the disclosures of which are incorporated herein by reference in their entirety.

TECHNICAL FIELD

The present invention relates to a catalyst with improved $NH_3$-formation activity, as well as to a method for the treatment of automobile exhaust gas and to a treatment system for an automobile exhaust gas stream. In particular, the present invention relates to a three-way catalyst (TWC) which may be used in conjunction with a selective catalytic reduction (SCR) catalyst.

BACKGROUND

One of the problems encountered in the treatment of automotive exhaust gas, and in particular, exhaust gas from lean burn engine such as diesel exhaust gas and lean burn gasoline engines, concerns the treatment of nitrous oxides contained therein. To this effect, many exhaust gas treatment systems employed in automotive vehicles running under lean burn conditions incorporate a combination of a NOx storage catalyst located upstream of an SCR catalyst. In particular, nitrogen oxide contained in an exhaust gas stream is stored at lower temperatures in the NOx storage catalyst, to be released at higher operation temperature at which an effective reduction thereof in the SCR unit may be achieved. To this extent, it is usually necessary to employ a means of injecting a reducing agent into the gas stream downstream of the NOx storage catalyst and before the SCR unit for enabling the SCR reaction of nitrogen oxide to nitrogen. For achieving an optimal SCR activity, i.e. for keeping emissions of nitrogen oxides and/or of reducing agents such as ammonia and/or urea as low as possible, numerous solutions have been proposed to coordinate the activities of the individual components of an NOx storage catalyst, a reducing agent injection means located downstream thereof, and an SCR unit for reaction of the reducing agent and the nitrogen oxide under ideal stoichiometry depending on the inlet temperature.

DE 100 11 612 A1, for example, discloses an exhaust gas treatment system for combustion engines containing a sequence of an NOx storage catalyst, a urea injection unit, and an SCR catalyst provided in the exhaust gas conduit, wherein a system of sensors regulate the injection of urea depending on the oxygen content of the exhaust gas. WO 2008/022751, on the other hand, discloses an exhaust gas treatment system having the same sequence of components, wherein the infection of ammonia upstream of the SCR unit is specifically controlled in dependency of the exhaust gas inlet temperature.

A major drawback with respect to such exhaust gas treatment systems concerns the pronounced dependency on a means for introducing a reducing agent into the exhaust gas stream, which necessarily involve high precision apparatus for both permitting the right amount of a reducing agent to be introduced into the exhaust gas at the right time for allowing an optimal conversion thereof with nitrogen oxide to nitrogen in an SCR unit. In particular, such systems require a regular maintenance for optimal functioning, and are sensitive to weather conditions, especially in the winter, when low temperatures may severally impede a proper operation mode. As a result, efforts have been made to provide exhaust treatment systems which do not display a dependency as pronounced as in the aforementioned systems, of which are even largely independent from the use of an external source of a reduction agent for treating nitrogen oxide emissions in an SCR unit.

In this respect, WO 2009/134831 discloses an exhaust treatment system for the treatment of nitrogen oxide emissions which contains a combination of a three-way catalytic device located upstream of an SCR unit, and which does not contain an external means of introducing a reducing agent into the treatment system. In particular said system relies on the in situ generation of ammonia in the three-way catalytic device, wherein the generation thereof is adapted to the ammonia needs of the SCR unit by controlling the fuel injection means such that the composition of the exhaust gas stream, and thus the stoichiometry of the components necessary for the production of ammonia on the three-way catalyst is adapted accordingly. DE 101 52 187, on the other hand, provides an alternative route by transferring the stoichiometric control of ammonia in dependency of the nitrogen oxide content in the exhaust gas stream to the exhaust gas system itself, by using a combination of nitrogen oxide and ammonia traps located therein, and controlling the exhaust gas flow by a vent system which regulates the stream in a series of parallel channels.

Independently of the manner in which in situ ammonia generation is achieved in such systems, there remains an ongoing need for improved three-way catalysts for the generation of ammonia. In particular, there is a need for catalysts which display a high activity with respect to the formation of ammonia in rich exhaust gas phases for reducing the necessity and the duration of said phases in view of further reducing total exhaust emissions. Furthermore, a challenging problem in the development of such improved catalysts relates to the fact that the improvement in ammonia yield usually goes hand in hand with a worsening of the three-way catalyst's further functions, in particular regarding its oxidation capacity with respect to hydrocarbons.

SUMMARY

According to one or more embodiments, provided is a novel three-way catalyst which displays an improved $NH_3$-generation activity, yet maintains a high conversion rate with respect to the treatment of hydrocarbons, in particular during the hydrocarbon rich exhaust gas phases. Also provided are methods for the treatment of automobile exhaust gas and a treatment system for an automobile exhaust gas stream

DESCRIPTION

It has surprisingly been found that a catalyst according to the present invention provides a high activity towards $NH_3$-formation without impeding the catalyst's ability to provide a high hydrocarbon oxidation activity, in particular during the hydrocarbon rich exhaust gas phases. As a result of this, the inventive catalyst may be advantageously used in exhaust gas treatment systems devoid of an external means for introducing reducing agents for allowing selective catalytic reduction of nitrogen oxide in an SCR unit contained therein, in particular since an excellent treatment of hydrocarbon (HC) emissions is provided, in particular in the rich phases of exhaust gas treatment. As a result of these combined effects of the inventive catalyst, the duration of the rich phases may be reduced without concurrently sacrificing the efficiency of the treatment of HC emissions, in particular in lean burn applications such as in diesel and lean burn gasoline engines. As a result of this, the inventive catalyst allows an effective reduction of total emissions when employed in an exhaust gas treatment system, wherein this result is particularly apparent in the treatment of exhaust gas from lean burn engines such as from gasoline direct injection engines.

Thus, certain embodiments of the present invention relate to a catalyst comprising a substrate and a catalyst coating, the catalyst coating comprising three or more layers, said layers comprising:
  (a) a first layer provided on the substrate, said first layer comprising Pd and Rh; and
  (b) a second layer provided on the first layer, said second layer comprising Pt and/or Pd, preferably Pt and Pd;
the first and second layers each further comprising:
  one or more particulate support materials, wherein preferably at least part of the one or more platinum group metals is supported on the one or more particulate support materials;
  one or more oxygen storage component (OSC) materials; and
  one or more nitrogen oxide storage materials comprising one or more elements selected from the group of alkali and/or alkaline earth metals,
wherein the total amount of alkali and alkaline earth metals comprised in the one or more nitrogen oxide storage materials contained in the catalyst ranges from 0.18 to 2.0 g/in$^3$ calculated as the respective alkali metal oxides $M_2O$ and alkaline earth metal oxides MO, preferably from 0.2 to 1.5 g/in$^3$, more preferably from 0.3 to 1.0 g/in$^3$, more preferably from 0.4 to 0.8 g/in$^3$, more preferably from 0.45 to 0.6 g/in$^3$, and even more preferably from 0.5 to 0.55 g/in$^3$.

Within the meaning of the present invention, unless stated otherwise, the term "nitrogen oxide storage material" and in particular "one or more nitrogen oxide storage materials" preferably refers to the nitrogen oxide storage material and to the one or more nitrogen oxide storage materials, respectively, wherein said material or materials comprise one or more elements selected from the group of alkali and/or alkaline earth metals according to the embodiments and preferred embodiments of said nitrogen oxide storage material or one or more nitrogen oxide storage materials as defined in the present invention.

As the substrate, any material may be used provided that it may support the layers of the catalyst and that it is resistant to the conditions which reign during the exhaust gas treatment process. The substrate according to the present invention may be of any conceivable shape, provided that it allows for the fluid contact with at least a portion of the layers present thereon. Preferably, the substrate is a monolith, wherein more preferably the monolith is a flow-through monolith. Suitable substrates include any of those materials typically used for preparing catalysts, and will usually comprise a ceramic or metal honeycomb structure. Accordingly, the monolithic substrate contains fine, parallel gas flow passages extending from an inlet to an outlet face of the substrate, such that passages are open to fluid flow (referred to as honeycomb flow through substrates). The passages, which are essentially straight paths from their fluid net to their fluid outlet, are defined by walls on which the layers are disposed, so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, or circular. Such structures may contain up to 900 gas inlet openings (i.e., cells) per square inch of cross section, wherein according to the present invention structures preferably have from 50 to 600 openings per square inch, more preferably from 300 to 500, and even more preferably from 350 to 400.

Thus, according to a preferred embodiment of the present invention, the catalyst comprises a substrate which is a monolith, preferably a flow-through monolith, more preferably a flow through monolith having a honeycomb-structure.

In general, the substrate can be made from materials commonly known in the art. For this purpose, porous materials are preferably used as the substrate material, in particular ceramic and ceramic-like materials such as cordierite, $\alpha$-alumina, an aluminosilicate, cordierite-alumina, silicon carbide, aluminum titanate, silicon nitride, zirconia, mullite, zircon, zircon mullite, zircon silicate, sillimanite, magnesium silicate, petalite, spodumene, alumina-silica-magnesia and zirconium silicate, as well as porous refractory metals and oxides thereof. According to the present invention, "refractory metal" refers to one or more metals selected from the group consisting of Ti, Zr, Hf, V, Nb, Ta, Cr, Mo, W, and Re. The substrate may also be formed of ceramic fiber composite materials. According to the present invention, the substrate is preferably formed from cordierite, silicon carbide, and/or from aluminum titanate. In general, materials are preferred which are able to withstand the high temperatures to which a catalyst is exposed to, in particular when used in the treatment of automotive exhaust gas. Furthermore, it will be understood that the loading of the catalytic composition on a wall flow substrate will depend on substrate properties such as porosity and wall thickness.

The substrates useful for the catalysts of embodiments of the present invention may also be metallic in nature and be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt.-% of the alloy, e.g., 10-25 wt.-% of chromium, 3-8 wt.-% of aluminum and up to 20 wt.-% of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates. Such high temperature-induced oxidation may enhance the subsequent adherence of the compositions to the substrate.

According to one or more embodiments of the present invention, the first and second layers comprise one or more oxygen storage component (OSC) materials. In principle, any oxygen storage component material may be used, provided that it may reversibly store oxygen. Preferably, said oxygen storage component material comprises one or more compounds selected from the group consisting of zirconia, ceria, lanthana, praseodymia, neodymia, and mixtures thereof, wherein the one or more OSC materials preferably comprise ceria and/or zirconia. According to particularly preferred embodiments, the OSC material comprises a ceria-zirconia composite and/or mixed oxide.

Within the meaning of the present invention, values expressed in % generally refer to wt.-% unless specified otherwise. Furthermore, the term "comprising" as employed in the present invention generally indicates that a component is contained in a specific component, without however excluding the presence of further materials or compounds in said component. According to a preferred meaning of the present invention, however, the term "comprising" is used in the sense of "consisting of", such that the presence of further components than those specifically designated is excluded.

According to the present invention, the one or more OSC materials comprised in the first and second layers of the catalyst coating may be the same or different from one another. According to preferred embodiments, the first and second layers both contain one or more OSC materials comprising a ceria-zirconia composite and/or mixed oxide, wherein more preferably the ceria-zirconia composite and/or mixed oxide contains from 30 to 85 wt.-% $CeO_2$, preferably from 35 to 70 wt.-%, more preferably from 40 to 55 wt.-%, and even more preferably from 43 to 47 wt.-% of ceria. According to a particularly preferred embodiment, the second layer comprises ceria-zirconia composite and/or mixed oxide containing from 10 to 39 wt.-% $CeO_2$, preferably from 15 to 34 wt.-%, more preferably from 20 to 32 wt.-%, and even more preferably from 25 to 30 wt.-% of ceria. In principle, any possible loading of the one or more OSC materials may be chosen in the catalyst, provided that a sufficient level of oxygen storage is provided, and that the oxygen storage capacity of the catalyst does not interfere with its capacity to provide both a high level of $NH_3$-formation and HC oxidation activity. In general, the total loading of the one or more OSC materials contained in the catalyst may range from 0.1 to 5.0 $g/in^3$, preferably from 0.5 to 3.0 $g/in^3$, more preferably from 0.7 to 2.0 $g/in^3$, more preferably from 0.8 to 1.5 $g/in^3$, and even more preferably from 0.9 to 1.4 $g/in^3$. According to the present invention, the loading of the one or more OSC materials specifically contained in the first layer may range from 0.05 to 3.0 $g/in^3$, preferably from 0.10 to 2.0 $g/in^3$, more preferably from 0.50 to 1.5 $g/in^3$, more preferably from 0.80 to 1.0 $g/in^3$, more preferably from 0.85 to 0.90 $g/in^3$, and even more preferably from 0.87 to 0.89 $g/in^3$. Furthermore or alternatively, the loading of the one or more OSC materials specifically contained in the second layer may range from 0.001 to 0.50 $g/in^3$, preferably from 0.005 to 0.10 $g/in^3$, more preferably from 0.010 to 0.050 $g/in^3$, more preferably from 0.020 to 0.035 $g/in^3$, and even more preferably from 0.025 to 0.030 $g/in^3$. According to further preferred embodiments, the loading of the one or more OSC materials specifically contained in the second layer may range from 0.01 to 5.0 $g/in^3$, preferably from 0.05 to 2.0 $g/in^3$, more preferably from 0.10 to 1.0 $g/in^3$, more preferably from 0.30 to 0.80 $g/in^3$, more preferably from 0.40 to 0.60 $g/in^3$, and even more preferably from 0.45 to 0.55 $g/in^3$.

According to one or more embodiments of the present invention, the first layer in the catalyst coating comprises Pd and Rh. Furthermore, the second layer in the catalyst coating comprises Pt and/or Pd, preferably Pt and Pd. In principle, any conceivable loading of these platinum group metals may be contained in the catalyst coating and, preferably, in the first and second layers contained therein. Thus, the catalyst may comprise Pd in a loading of from 20 to 200 $g/ft^3$, preferably of from 50 to 150 $g/ft^3$, more preferably of from 80 to 110 $g/ft^3$, and even more preferably of from 90 to 100 $g/ft^3$. Furthermore of alternatively, the catalyst may comprise Pt in a loading of from 0.5 to 50 $g/ft^3$, preferable of from 1 to 30 $g/ft^3$, more preferably of from 2 to 20 $g/ft^3$, more preferably of from 3 to 15 $g/ft^3$, more preferably of from 5 to 10 $g/ft^3$, and even more preferably of from 7 to 9 $g/ft^3$. Furthermore of alternatively, the catalyst may comprise Rh in a loading of from 0.1 to 10 $g/ft^3$, preferable of from 0.5 to 5 $g/ft^3$, more preferably of from 0.75 to 4 $g/ft^3$, more preferably of from 1.0 to 3.5 $g/ft^3$, more preferably of from 1.25 to 3 $g/ft^3$, and even more preferably of from 1.5 to 2.5 $g/ft^3$ In general, the loading with these platinum group metals refers to their content in the catalyst, wherein these platinum group metals are preferably contained in the catalyst coating, and more preferably in the first and second layers comprised in said coating, to the content of which the loadings preferably refer to, respectively. According to preferred embodiments of the present invention wherein Pd is comprised in the second layer, preferably in addition to Pt, the loading of Pd in said layer may range from 0.1 to 150 $g/ft^3$, preferably from 0.5 to 100 $g/ft^3$, more preferably from 1 to 50 $g/ft^3$, more preferably from 5 to 20 $g/ft^3$, more preferably from 7 to 15 $g/ft^3$, and even more preferably from 9 to 10 $g/ft^3$. Furthermore or alternatively, the loading of Pd comprised in the first layer may range from 1 to 250 $g/ft^3$, preferably from 5 to 200 $g/ft^3$, more preferably from 10 to 150 $g/ft^3$, more preferably from 50 to 100 $g/ft$, and even more preferably 85 to 90 $g/ft^3$.

According to the present invention, there is generally no restriction with respect to the presence of further platinum group metals in the catalyst, provided that said metals do not hinder the catalyst's ability to treat exhaust gas and in particular to provide a high level of both HC, oxidation and $NH_3$-formation activity. Within the meaning of the present invention, unless explicitly stated otherwise, the term "platinum group metals" refers to the elements Ru, Rh, Pd, Os, Ir, and Pt.

According to particular embodiments of the present invention, it is preferred that the first layer comprises less than 500 ppm of Pt, and more preferably less than 500 ppm of further platinum group metal besides Rh and Pd. According to said preferred embodiments, it is further preferred that the first layer contains less than 50 ppm thereof, more preferably less than 10 ppm, more preferably less than 1 ppm, and even more preferably less than 0.1 ppm thereof. Furthermore or alternatively, it is preferred according to the present invention that the second layer comprises less than 500 ppm of Rh, and more preferably less than 500 ppm of further platinum group metal besides Pt and/or Pd, and even more preferably less than 500 ppm of further platinum group metal besides Pt and Pd. Again, according to said preferred embodiments, it is further preferred that the first layer contains less than 50 ppm thereof, more preferably less than 10 ppm, more preferably less than 1 ppm, and even more preferably less than 0.1 ppm thereof.

In general, according to present invention, in embodiments of the catalyst comprising both Pt and Pd, there is no particular restriction as to the weight ratio of Pt to Pd contained therein. It is noted that, unless specified otherwise, ratios of elements and/or compounds according to the present invention generally refers to the weight ratios thereof. Thus, the Pt:Pd weight ratio in the catalyst may range anywhere from 1:100 to 10:1, more preferably of from 1:70 to 5:1, more preferably of from 1:50 to 2:1, more preferably of from 1:30 to 1:1, more preferably of from 1:20 to 1:2, more preferably of from 1:15 to 1:5, and even more preferably of from 1:13 to 1:10.

In general, the platinum group metal components of the catalyst, and in particular Pt, Pd, and Rh may be contained therein in any suitable form and fashion, provided that the catalyst displays a high level of HC oxidation and $NH_3$ formation activity in the treatment of exhaust gas. Thus, the platinum group metal components may be contained therein as such and/or may be supported on one or more of the catalyst components, preferably on one or more of the further components contained in the first and second layers of the catalyst coating. The platinum group metal components may therefore at least in part or entirely be supported any one of the one or more particulate support materials, of the one or more OSC materials, and/or on one or more of the nitrogen oxide storage materials. It is noted herewith, that the term "nitrogen oxide" as used in the present invention generally refers to binary compounds of nitrogen and oxygen, and preferably to NO, $NO_2$, and $N_2O$, and even more preferably to NO and $NO_2$. Furthermore, within the meaning of the present invention, the term "$NO_x$" refers to the compounds NO and $NO_2$.

In preferred embodiments of the catalyst according to the present invention, the platinum group metals and in particular Pt, Pd, and/or Rh are at least in part and preferably entirely supported on one or more particulate support materials. In embodiments wherein more than one platinum group metal and in particular Pd and Rh are both contained in the first layer of the catalyst coating, said platinum group metals are preferably at least part supported on different particulate support materials, wherein more preferably the platinum group metals are separately supported on the one or more particulate support materials and/or on one or more further components contained in the first and/or second layer.

Thus according to preferred embodiments of the present invention. Pd and Rh comprised in the first layer are at least in part supported on separate particulate support materials, and preferably, wherein Pd and Rh are supported on separate particulate support materials In general, any conceivable particulate support material may be contained in the catalyst, provided that it may withstand the conditions encountered in exhaust gas treatment processes, and that it may suitably support one or more further catalyst components and in particular one or more platinum group metals, preferably Pd and/or Pt. According to preferred embodiments, the particulate support material comprises one or more oxides and more preferably one or more metal oxides. Preferably, high surface area refractory metal oxide supports such as alumina support materials, also referred to as "gamma alumina" or "activated alumina," are used. Said materials typically exhibit a BET surface area ranging from 60 to 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst. "BET surface area" has its usual meaning of referring to the Brunauer, Emmett, Teller method for determining surface area by $N_2$ adsorption. Pore diameter and pore volume can also be determined using BET-type $N_x$ adsorption. Preferably, the active alumina has a specific surface area comprised in the range of from 60 to 350 $m^2/g$, and typically 90 to 250 $m^2/g$.

According to preferred embodiments of the present invention, the metal oxide, and in particular the metal oxide support particles, preferably contained in the one or more particulate support materials preferably comprises at least one compound selected from the group consisting of alumina, titania, titania-alumina, zirconia-alumina, baria-alumina, ceria-alumina, baria-ceria-alumina, lanthana-alumina, lanthana-zirconia-alumina, titania-zirconia, and mixtures thereof. It is further preferred that the at least one compound is selected from the group consisting of alumina, zirconia-alumina, lanthana-alumina, lanthana-zirconia-alumina, and mixtures thereof, more preferably from the group consisting of zirconia-alumina, lanthana-alumina, lanthana-zirconia-alumina, and mixtures thereof, wherein even more preferably the one or more particulate support materials comprise lanthana-alumina and/or zirconia-alumina.

According to particularly preferred embodiments the one or more metal oxides, and in particular the metal oxide support particles comprised in the one or more particulate support materials, are doped with one or more compounds. Thus, the metal oxide and preferably alumina may be preferably doped with one or more compounds, preferably with lanthanum and/or zirconium. In said embodiments, there is no specific restriction as to the amount of the one or more compounds with which the metal oxide particles are doped. Thus, the metal oxide and preferably alumina may be doped with 30% or less of one or more compounds, preferably 20% or less, more preferably 10% or less, more preferably 5% or less, and even more preferably 1% or less. According to particularly preferred embodiments comprising alumina doped with lanthanum, it is preferred that alumina is doped with lanthanum in the range of from 0.5 to 25%, preferably of from 1 to 15%, more preferably of from 2 to 10%, more preferably of from 3 to 5%, and even more preferably of from 3.5 to 4.5%. Furthermore or alternatively, according to particularly preferred embodiments comprising alumina doped with zirconia, it is preferred that alumina is doped with zirconia in the range of from 0.5 to 50%, preferably of from 1 to 40%, more preferably of from 5 to 30%, more preferably of from 15 to 25%, and even more preferably of from 18 to 22%. Particularly preferred are embodiments comprising alumina doped with lanthana and alumina doped with zirconia, wherein the alumina is doped with zirconia in the range of from %, and wherein the further alumina is doped with lanthanum in the range of from %. According to particularly preferred embodiments thereof, the first layer comprises alumina doped with lanthanum and the second layer comprises alumina doped with zirconia as a respective particulate support material.

In general, the catalyst may comprise any suitable amount of the one or more particulate support materials, provided that the technical features of the catalyst may be provided, in particular with respect to a high level of HC oxidation and $NH_3$-formation activity. Thus, the loading of the catalyst with one or more particulate support materials may range from 0.5 to 20 $g/in^3$, preferably from 1 to 10 $g/in^3$, more preferably from 1.5 to 5 $g/in^3$, more preferably from 2 to 3 $g/in^3$, and even more preferably from 2.2 to 2.7 $g/in^3$. According to preferred embodiments thereof, the loading of the one or more particulate support materials in the first layer of the catalyst coating ranges from 0.05 to 10 $g/in^3$, preferably from 0.1 to 5 $g/in^3$, more preferably from 0.5 to 2 $g/in^3$, more preferably from 1.0 to 1.5 $g/in^3$, and even more preferably from 1.1 to 1.3 $g/in^3$. Furthermore of alternatively, the loading of the one or more particulate support materials in the second layer preferably ranges from 0.05 to 10 $g/in^3$, preferably from 0.1 to 5 $g/in^3$, more preferably from 0.5 to 2 $g/in^3$, and even more preferably from 1.0 to 1.5 $g/in^3$.

In one or more embodiments of the present invention, the first and second layers of the catalyst coating comprise one or more nitrogen oxide storage materials comprising one or more elements selected from the group of alkali and/or alkaline earth metals. In principle any element or combination of elements selected from the group of alkali and/or alkaline earth metals may be contained in the catalyst according to the present invention, provided that the technical effects of the present invention and in particular the high level of HC oxidation and $NH_3$-formation activity is provided by the catalyst. According to the present invention, the one or more alkali and/or alkaline earth metals contained in the nitrogen oxide storage material is preferably selected from the group consisting of Li, Na, K, Rb, Cs, Mg, Ca, Sr, and Ba, and more preferably from the group consisting of K, Mg, Sr, and Ba. According to particularly preferred embodiments, the one or more alkali and/or alkaline earth metals is selected from the group consisting of K, Mg, and Ba, wherein more preferably the one or more nitrogen oxide storage materials comprise Mg and/or Ba, even more preferably Ba.

In general, the one or more alkali and/or alkaline earth metals contained in the nitrogen oxide storage material may be contained in any suitable form, provided that the catalyst is capable of reversibly fixing nitrogen oxide. Preferably, the one or more alkali and/or alkaline earth metals are contained as their respective oxides and/or as their respective carbonates. According to a particularly preferred embodiment, the one or more alkali and/or alkaline earth metals are at least partly contained, and preferably entirely contained, as their respective carbonates.

Concerning the nitrogen oxide storage material comprised in the first and second layers of the catalyst coating, any conceivable element or compound may also be used in addition to said one or more elements selected from the group of alkali and/or alkaline earth metals, provided that said element or compound is capable of reversibly fixing nitrogen oxide. In particular the nitrogen oxide storage material is chosen such that it is capable of binding nitrogen oxide at lower temperatures and subsequently releasing it at higher temperatures, in particular at temperatures at which effective catalytic conversion thereof may be achieved. More specifically, lower temperatures as used in the present context refer to those encountered in automotive exhaust gas purification during cold start conditions, prior to which the engine is at most at ambient temperature. Higher temperatures, on the other hand, refer to those temperatures encountered when the exhaust gas system has attained a temperature at which it is fully operative with respect to exhaust gas treatment, in particular with respect to the conversion efficiency of nitrogen oxide emissions.

Within the meaning of the present invention, it is noted that the term "conversion" is used in the sense that it encompasses both the chemical conversion of emissions to other compounds, as well as the trapping of emissions by chemical and/or adsorptive binding to an appropriate trapping material. This applies in particular to the cold start periods in the treatment of automotive exhaust gas, since the effective trapping of emissions ideally has the effect of temporarily storing them until efficient conversion thereof may be achieved in the hotter phases of exhaust gas treatment. "Emissions" as used in the context of the present invention preferably refers to exhaust gas emissions, more preferably to exhaust gas emissions comprising NOx, CO, and hydrocarbons, and even more, preferably to NOx, CO, and hydrocarbons comprised in automotive exhaust gas.

According to the present invention, nitrogen oxide storage materials are preferred which in addition to the one or more elements selected from the group of alkali and/or alkaline earth metals further comprise at least one metal compound selected from the group of rare earth metal compounds, and in particular the respective oxides thereof, preferably from the group consisting of Ce, La, Pr, Nd, and mixtures thereof, wherein the further element further comprised in the one or more nitrogen oxide storage materials is preferably Ce, preferably as ceria.

In principle, any conceivable loading of the nitrogen oxide storage material may be chosen, provided that a sufficient amount of nitrogen oxide may be stored, and that the function of the remaining components comprised in the NOx storage catalyst is not impaired. In general, the loading of the total loading of the nitrogen oxide storage material in the catalyst may range from 0.2 to 5.0 $g/in^3$, preferably from 0.5 to 3.5 $g/in^3$, more preferably from 1.0 to 2.5 $g/in^3$, more preferably from 1.2 to 2.0 $g/in^3$, and even more preferably from 1.3 to 1.8 $g/in^3$. According to preferred embodiments thereof, the loading of the nitrogen oxide storage material in the first layer ranges from 0.1 to 5.0 $g/in^3$, preferably from 0.2 to 3.5 $g/in^3$, more preferably from 0.5 to 2.5 $g/in^3$, more preferably from 1.0 to 2.0 $g/in^3$, and even more preferably from 1.2 to 1.4 $g/in^3$. Furthermore or alternatively, the loading or the nitrogen oxide storage material in the second layer preferably ranges from 0.05 to 3.0 $g/in^3$, more preferably from 0.1 to 1.5 $g/in^3$, more preferably from 0.5 to 1.0 $g/in^3$, more preferably from 0.2 to 0.7 $g/in^3$, and even more preferably from 0.45 to 0.55 $g/in^3$.

With respect to particularly preferred embodiments of the present invention wherein Ba is comprised in the one or more nitrogen oxide storages materials, Ba is preferably contained in the catalyst in an amount ranging from 0.18 to 5 $g/in^3$ calculated as BaO, more preferably from 0.20 to 2 $g/in^3$, more preferably from 0.30 to 1 $g/in^3$, more preferably from 0.40 to 0.70 $g/in^3$, and even more preferably from 0.50 to 0.55 $g/in^3$ calculated as BaO.

According to the present invention, it is also particularly preferred that the second layer contains less than 500 ppm of Ba, wherein more preferably, the second layer contains less than 50 ppm of Ba, more preferably less than 10 ppm, more preferably less than 1 ppm, and even more preferably less than 0.1 ppm of Ba. According to embodiments which are further preferred, the second layer contains less than 500 ppm of alkali and/or alkaline earth metals, preferably of alkaline earth metals, wherein more preferably, the second layer contains less than 50 ppm thereof, more preferably less than 10 ppm, more preferably less than 1 ppm, and even more preferably less than 0.1 ppm thereof. According to further embodiments of the present invention which are preferred, the second layer contains less than 500 ppm of nitrogen oxide storage material, preferably less than 50 ppm, more preferably less than 10 ppm, more preferably less than 1 ppm, and even more preferably less than 0.1 ppm.

In the present invention, the catalyst coating and in particular the first and second layers contained therein may be provided in any conceivable manner, provided that the technical effects of the present invention may be achieved, in particular with respect to the high levels of HC oxidation and $NH_3$-formation activity. It is however preferred that the first and second layers, and preferably that the catalyst coating containing said layers, is contained in the catalyst as a washcoat layer. As used herein, the term "washcoat" has its usual meaning in the art of a thin, adherent coating of a catalytic or other material applied to a substrate carrier material, such as a honeycomb-type carrier member, which is preferably sufficiently porous to permit the passage there through of the gas stream being treated.

Furthermore, according to the present invention, one or more further layers may be comprised in the catalyst coating in addition to the first and second layers. According to particularly preferred embodiments of the present invention, the first layer itself comprises two or more separate layers, wherein more preferably two separate layers are comprised therein. Said layers may have the same chemical composition, in particular with respect to Pd and Rh contained therein, as well as with respect to the one or more particulate support materials, the one or more 080 materials, and the one or more nitrogen oxide storage materials respectively contained in said two or more separate layers contained in the first layer of the inventive catalyst or, alternatively, may differ in one or more of said components respectively contained in said two or more separate layers. In particular, within the meaning of the present invention, two or more separate layers comprised in the first layer of the catalyst refers to separate layers which are provided on one another, and wherein the respective chemical composition of said individual layers is a chemical composition according to the embodiments and preferred embodiments of the first layer of the inventive catalyst.

Thus according to preferred embodiments of the catalyst of the present invention, the first layer comprises two or more separate layers, said separate layers being provided on one another.

According to particularly preferred embodiments of the present invention, the first layer comprises:
(a') a layer containing Pd; and
(a") a layer containing Rh;
the layers (a') and (a") each further comprising:
   one or more particulate support materials, wherein preferably at least part of the platinum group metal is supported on the one or more particulate support materials;
   one or more oxygen storage component (OSC) materials; and
   one or more nitrogen oxide storage materials comprising one or more elements selected from the group of alkali and/or alkaline earth metals, and
wherein preferably the layer (a') is provided on the substrate, and the layer (a") is provided on the layer (a').

Regarding the individual components of layer (a') and (a"), and in particular regarding the one or more particulate support materials, the one or more oxygen storage component (OSC) materials, and the one or more nitrogen oxide storage materials contained therein, the same applies accordingly as with respect to the components of the embodiments and preferred embodiments of the first layer of the catalyst, as well as with respect to the embodiments and preferred embodiments of the inventive catalyst in general as disclosed and defined in the foregoing.

According to particular embodiments of the present invention, it is preferred that the layer (a") comprises less than 500 ppm of Pt and/or Rh, preferably Pt and Rh, and preferably less than 500 ppm of further platinum group metal besides Pd. According to said preferred embodiments, it is further preferred that the first layer contains less than 50 ppm thereof, more preferably less than 10 ppm, more preferably less than 1 ppm, and even more preferably less than 0.1 ppm thereof. Furthermore or alternatively, it is preferred according to the present invention that the layer (a") comprises less than 500 ppm of Pt and/or Pd, preferably Pt and Pd, and preferably less than 500 ppm of further platinum group metal besides Rh. Again, according to said preferred embodiments, it is further preferred that the first layer contains less than 50 ppm thereof, more preferably less than 10 ppm, more preferably less than 1 ppm, and even more preferably less than 0.1 ppm thereof.

Thus, embodiments according to the present invention are further preferred, wherein the layer (a') comprises less than 500 ppm of Pt and/or Rh, preferably Pt and Rh, and preferably less than 500 ppm of further platinum group metal besides Pd,
   and/or, preferably and,
wherein the layer (a") comprises less than 500 ppm of Pt and/or Pd, preferably Pt and Pd, and preferably less than 500 ppm of further platinum group metal besides Rh
   and/or, preferably and,
wherein the second layer comprises less than 500 ppm of Rh, more preferably less than 500 ppm of further platinum group metal besides Pt acid/or Pd, preferably Pt and Pd.

Furthermore, according to further preferred embodiments, the one or more OSC materials comprised in layer (a') and (a") of the first layer may be the same of different from one another. According to particularly preferred embodiments, layers (a') and (a") both contain one or more OSC materials comprising a ceria-zirconia composite and/or mixed oxide, wherein more preferably layer (a') contains one or more OSC materials comprising a ceria-zirconia composite and/or mixed oxide containing 30 to 85 wt.-% $CeO_2$, preferably with 35 to 70 wt.-%, more preferably with 40 to 55 wt.-%, and even more preferably with 43 to 47 wt.-% of ceria. Furthermore or alternatively, layer (a") preferably contains one or more OSC materials comprising a ceria-zirconia composite and/or mixed oxide containing 10 to 39 wt.-% $CeO_2$, preferably with 15 to 34 wt.-%, more preferably with 20 to 32 wt.-%, and even more preferably with 25 to 30 wt.-% of ceria.

Thus, embodiments of the inventive catalyst are further preferred, wherein the ceria-zirconia composite comprised in layer (a') is a ceria-zirconia composite with 30 to 85 wt.-% $CeO_2$, preferably with 35 to 70 wt.-%, more preferably with 40 to 55 wt.-%, and even more preferably with 43 to 47 wt.-% $CeO_2$,
and/or, preferably and,
wherein the ceria-zirconia composite comprised in layer (a") and/or in the second layer, preferably in both layer (a") and in the second layer, is a ceria-zirconia composite with 10 to 39 wt.-% $CeO_2$, preferably with 15 to 34 wt.-%, more preferably with 20 to 32 wt.-%, and even more preferably with 25 to 30 wt.-%.

In principle, any possible loading of the one or more OSC materials may be chosen in the layers (a') and (a"), provided that a sufficient level of oxygen storage is provided, and that the oxygen storage capacity of the catalyst does not interfere with its capacity to provide both a high level of $NH_3$-formation and HC oxidation activity. According to the present invention, the loading of the one or more OSC materials specifically contained in layer (a') may range from 0.01 to 5.0 $g/in^3$, preferably from 0.05 to 3.0 $g/in^3$, more preferably from 0.1 to 1.0 $g/in^3$, more preferably from 0.2 to 0.5 $g/in^3$, and even more preferably from 0.25 to 0.35 $g/in^3$. Furthermore or alternatively, the loading of the one or more OSC materials specifically contained in layer (a") may range from 0.01 to 7.0 $g/in^3$, preferably from 0.05 to 5.0 $g/in^3$, more preferably from 0.10 to 2.0 more preferably from 0.30 to 1.0 $g/in^3$, more preferably from 0.40 to 0.70 $g/in^3$, and even more preferably from 0.45 to 0.55 $g/in^3$.

According to particularly preferred embodiments of the present invention, layer (a') contains 50 wt.-% or more of the one or more nitrogen oxide storage materials, preferably 70 wt.-% or more, more preferably 80 wt.-% or more, more preferably 90 wt.-% or more, more preferably 95 wt.-% or more, more preferably 98 wt.-% or more, more preferably 99 wt.-% or more, more preferably 99.9 wt.-% or more, and even more preferably wherein 99.99 wt.-% of the one or more nitrogen oxide storage materials of the catalyst coating are contained in layer (a') thereof.

The catalyst coating and in particular the first and second layers comprised therein may further comprise additives commonly used in the art for providing catalyst coatings such as one or more promoters, one or more stabilizers, or one or more binders. According to preferred embodiments, the catalyst coating comprises one or more binders, wherein the binder preferably comprises aluminum oxyhydrate, preferably in nanoparticular form, and even more preferably wherein the binder comprises boehmite.

According to a preferred embodiment of the present invention, the catalyst is comprised in an exhaust gas treatment system. In particular, the treatment system according to the present invention comprises an internal combustion engine, an exhaust gas conduit in fluid communication with the engine, wherein the catalyst as described herein is provided within the exhaust gas conduit. In principle, any conceivable combustion engine may be used in the treatment system of the present invention, wherein preferably a lean burn engine is used such as a diesel engine or a lean burn gasoline engine, more preferably a lean burn gasoline engine, and even more preferably a gasoline direct injection engine.

Thus, the present invention also relates to an exhaust gas treatment system comprising an internal combustion engine and an exhaust gas conduit in fluid communication with the internal combustion engine, wherein the catalyst is present in the exhaust gas conduit, wherein the internal combustion engine is preferably a gasoline engine, and more preferably a gasoline direct injection engine.

According to particularly preferred embodiments, the exhaust gas treatment system in which the catalyst is comprised contains one or more further components. In particular the exhaust gas treatment system preferably further contains a selective catalytic reduction (SCR) catalyst which located in the exhaust gas conduit, the SCR catalyst preferably being located downstream of the catalyst. More preferably, the exhaust gas treatment system does not further comprise a means of feeding a reducing agent into the exhaust gas conduit, in particular a means of feeding a reducing agent which is located between the catalyst and the SCR catalyst. Within the meaning of the present invention, "reducing agent" refers to any conceivable compound which may be used in that function, provided it is suited for reducing nitrogen oxide, in particular in the SCR catalyst, wherein said reducing agent preferably refers ammonia and/or urea, and in particular to ammonia.

A suitable SCR catalyst component for use in the exhaust treatment system is one which is able to effectively catalyze the reduction of the $NO_x$ component at temperatures below 600° C., so that adequate $NO_x$ levels can be treated even under conditions of low load which typically are associated with lower exhaust temperatures. Preferably, the catalyst article is capable of converting at least 50% of the $NO_x$ component to $N_2$, depending on the amount of a reductant such as $NH_3$ which is preferably added to the system. In this respect, another desirable attribute for the composition is that it possesses the ability to catalyze the reaction of $O_2$ with any excess $NH_3$ to $N_2$ and $H_2O$, so that $NH_3$ is not emitted to the atmosphere. Useful SCR catalyst compositions used in the emission treatment system should also have thermal resistance to temperatures greater than 650° C.

Suitable SCR catalyst compositions are described, for instance, in U.S. Pat. No. 4,961,917 and U.S. Pat. No. 5,516,497. Suitable compositions include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of $NO_x$ with $NH_3$ to $N_2$, the disclosed compositions can also promote the oxidation of excess $NH_3$ with $O_2$, especially for those compositions having higher promoter concentrations. According to the present invention, it is particularly preferred to use a Cu-containing SCR catalyst in the exhaust gas treatment system in which the catalyst is preferably comprised, and more preferably an SCR catalyst containing Fe in addition to Cu.

Thus, according to particularly preferred embodiments of the present invention, the catalyst is comprised in an exhaust gas treatment system further containing a selective catalytic reduction (SCR) catalyst in the exhaust gas conduit, preferably a Cu-containing SCR catalyst, more preferably an SCR catalyst containing Cu and Fe, the SCR catalyst preferably being located downstream of the catalyst.

The catalyst according to the present invention can be readily prepared by processes well known in the prior art. In particular, the several components of the catalyst material may be applied to the substrate as mixtures of one or more components in sequential steps in a manner which will be readily apparent to those skilled in the art of catalyst manufacture. A typical method of manufacturing the catalyst of the present invention is to respectively provide the one or more platinum group metals, one or more particulate support materials, the one or more oxygen storage component (OSC) materials, and the one or more nitrogen oxide storage materials as a coating or washcoat layer on the walls of the gas-flow passages of a suitable carrier member, wherein the respective components of the first and second layer comprised in the catalyst coating are provided as two or more washcoat layers on the substrate.

According to the present invention, the components of the individual washcoat layers may respectively be processed to a slurry, preferably to an aqueous slurry. The substrate may then be sequentially immersed into the respective slurries for the individual washcoats, after which excess slurry is removed to provide a thin coating of the two or more slurries on the walls of the gas-flow passages of the substrate. The coated substrate is then dried and calcined to provide an adherent coating of the respective component to the walls of the passages. Thus, after providing the first washcoat layer on the substrate, the coated substrate may then be immersed into a further slurry to form the second washcoat layer deposited over the first washcoat layer. The substrate is then dried and/or calcined, wherein drying and/or calcination steps are preferably performed after each step of providing a washcoat layer onto the substrate or of providing a second or further washcoat layer onto the catalyst.

Thus, the present invention also relates to a method for producing a catalyst comprising the steps of:
(i) providing a substrate;
(ii) impregnating one or more particulate support materials with at least one Pd-source, wherein the impregnation is preferably achieved by incipient wetness;
(iii) impregnating one or more particulate support materials with at least one Rh-source, wherein the impregnation is preferably achieved by incipient wetness;
(iv) uniting the products obtained in steps (ii) and (iii), preferably by admixing;
(v) adding one or more oxygen storage component (OSC) materials, one or more nitrogen oxide storage materials comprising one or more elements selected from the group of alkali and/or alkaline earth metals, and a solvent, preferably water, more preferably distilled water, to the product obtained in step (iv) to obtain a slurry, preferably by admixing the resulting mixture;
(vi) milling the slurry obtained in step (v), preferably to a particle size $d_{90}$ of 50 μm or less, more preferably of 30 μm or less, more preferably of 20 μm or less, and even more preferably of 10 μm or less;
(vii) providing the resulting slurry of step (vi) onto the substrate in one or more coating steps as a layer, preferably as a washcoat layer;
(viii) impregnating one or more particulate support materials with at least one Pt- and/or at least one Pd-source, preferably with both a Pt- and a Pd-source, wherein the impregnation is preferably achieved by incipient wetness;
(ix) adding one or more oxygen storage component (OSC) materials, one or more nitrogen oxide storage materials comprising one or more elements selected from the group of alkali and/or alkaline earth metals, and a solvent, preferably water, more preferably distilled water, to the product obtained in step (viii) to obtain a slurry, preferably by admixing the resulting mixture;

(x) milling the slurry obtained in step (ix), preferably to a particle size $d_{90}$ of 50 μm or less, more preferably of 30 μm or less, more preferably of 20 μm or less, and even more preferably of 10 μm or less;

(xi) providing the resulting slurry of step (x) onto the substrate in one or more coating steps as a layer, preferably as a washcoat layer;

wherein a step of drying and/or a calcination step is preferably conducted after step (vii) and/or step (xi), more preferably a step of drying followed by a calcination step, wherein even more preferably a step of drying and/or a calcination step, preferably a step of drying followed by a calcination step, is conducted after each of steps (vii) and (xi), wherein the total amount of alkali and alkaline earth metals comprised in the one or more nitrogen oxide storage materials contained in the catalyst ranges from 0.18 to 2.0 $g/in^3$ calculated as the respective alkali metal oxides $M_2O$ and alkaline earth metal oxides MO, preferably from 0.2 to 1.5 $g/in^3$, more preferably from 0.3 to 1.0 $g/in^3$, more preferably from 0.4 to 0.8 $g/in^3$, more preferably from 0.45 to 0.6 $g/in^3$, and even more preferably from 0.5 to 0.55 $g/in^3$.

In the method of the present invention, the one or more particulate support material of step (ii) is not the same particulate support material used in step (iii), such that according to the inventive process, Pd and Rh are not supported on the same particulate support materials in said steps.

According to preferred embodiments of the inventive process, the catalyst layer provided in step (xi) contains less than less than 50 ppm, more preferably less than 10 ppm, more preferably less than 1 ppm, and even more preferably less than 0.1 ppm of Ba.

Within the meaning of the present invention, the term "impregnated" refers to the result of a process, wherein a solution containing one or more components, and in particular containing Pt and/or Pd, is put into the pores of a given support material, and in particular of a particulate, support material. In preferred embodiments, impregnation of said components is achieved by incipient wetness, wherein for example a volume of diluted Pt- and/or Pd-containing solution is approximately equal to the pore volume of the support bodies. Incipient wetness impregnation generally leads to a substantially uniform distribution of the solution of the one or more components throughout the pore system of the support.

In the present invention it is further preferred to provide separate layers (a') comprising Pd and (a") comprising Rh, such that the present invention further relates to a method for producing a catalyst comprising the steps of:

(i) providing a substrate;

(ii) impregnating one or more particulate support materials with at least one Pd-source, wherein the impregnation is preferably achieved by incipient wetness;

(iii) adding one or more oxygen storage component (OSC) materials, one or more nitrogen oxide storage materials comprising one or more elements selected from the group of alkali and/or alkaline earth metals, and a solvent, preferably water, more preferably distilled water, to the product obtained in step (ii) to obtain a slurry, preferably by admixing the resulting mixture;

(iv) milling the slurry obtained in step (iii), preferably to a particle size $d_{90}$ of 50 μm or less, more preferably of 30 μm or less, more preferably of 20 μm or less, and even more preferably of 10 μm or less;

(v) providing the resulting slurry of step (iv) onto the substrate in one or more coating steps as a layer, preferably as a washcoat layer;

(vi) impregnating one or more particulate support materials with at least one Rh-source, wherein the impregnation is preferably achieved by incipient wetness;

(vii) adding one or more oxygen storage component (OSC) materials, one or more nitrogen oxide storage materials comprising one or more elements selected from the group of alkali and/or alkaline earth metals, and a solvent, preferably water, more preferably distilled water, to the product obtained in step (vi) to obtain a slurry, preferably by admixing the resulting mixture;

(viii) milling the slurry obtained in step (vii), preferably to a particle size $d_{90}$ of 50 μm or less, more preferably of 30 μm or less, more preferably of 20 μm or less, and even more preferably of 10 μm or less;

(ix) providing the resulting slurry of step (viii) onto the substrate in one or more coating steps as a layer, preferably as a washcoat layer;

(x) impregnating one or more particulate support materials with at least one Pt- and/or at least one Pd-source, preferably with both a Pt- and a Pd-source, wherein the impregnation is preferably achieved by incipient wetness;

(xi) adding one or more oxygen storage component (OSC) materials, one or more nitrogen oxide storage materials comprising one or more elements selected from the group of alkali and/or alkaline earth metals, and a solvent, preferably water, more preferably distilled water, to the product obtained in step (x) to obtain a slurry, preferably by admixing the resulting mixture;

(xii) milling the slurry obtained in step (xi), preferably to a particle size $d_{90}$ of 50 μm or less, more preferably of 30 μm or less, more preferably of 20 μm or less, and even more preferably of 10 μm or less;

(xiii) providing the resulting slurry of step (xii) onto the substrate in one or more coating steps as a layer, preferably as a washcoat layer;

wherein a step of drying and/or a calcination step is preferably conducted after step (v) and/or step (ix) and/or step (xiii), more preferably a step of drying followed by a calcination step, wherein even more preferably a step of drying and/or a calcination step, preferably a step of drying followed by a calcination step, is conducted after each of steps (v), (ix), and (xiii), wherein the total amount of alkali and alkaline earth metals comprised in the one or more nitrogen oxide storage materials contained in the catalyst ranges from 0.18 to 2.0 $g/in^3$ calculated as the respective alkali metal oxides $M_2O$ and alkaline earth metal oxides MO, preferably from 0.2 to 1.5 $g/in^3$, more preferably from 0.3 to 1.0 $g/in^3$, more preferably from 0.4 to 0.8 $g/in^3$, more preferably from 0.45 to 0.6 $g/in^3$, and even more preferably from 0.5 to 0.55 $g/in^3$.

According to preferred embodiments of said further inventive process, the catalyst layer provided in step (xiii) preferably contains less than 500 ppm of Ba, and more preferably less than 500 ppm of nitrogen oxide storage material, wherein even more preferably the resulting catalyst layers provided in steps (ix) and (xiii) preferably contain less than 500 ppm of Ba, and more preferably less than 500 ppm of nitrogen oxide storage material.

According to further embodiments of the present invention which are preferred, the catalyst is obtained or obtainable according to either of the inventive methods for producing a catalyst, and in particular, for producing a catalyst according to any one of the embodiments and preferred embodiments of the catalyst according to the present invention. Thus, according to the present invention, the method for producing a catalyst is preferably a method for producing a catalyst, wherein the catalyst is a catalyst according to the embodiments and preferred embodiments of the present invention.

In addition to these embodiments, the present invention also relates to a method for the treatment of a nitrogen oxide containing gas stream using the catalyst of the present invention. More specifically, the method of the present invention includes conducting a nitrogen oxide gas stream over and/or through the inventive catalyst. According to preferred embodiments of the inventive method, the gas stream is preferably an exhaust gas stream resulting from an internal combustion engine, and more preferably from a gasoline engine, wherein more preferably the exhaust gas results from combustion in a can burn gasoline engine, and even more preferably in a gasoline direct injection engine.

Thus, the present invention also concerns a process for the treatment of a gas stream comprising nitrogen oxide comprising conducting said gas stream over and/or through a catalyst according to the present invention, wherein the gas stream is preferably an exhaust gas stream resulting from an internal combustion engine, more preferably from a gasoline engine, more preferably from a can burn gasoline engine, and even more preferably from a gasoline direct injection engine. According to preferred embodiments of the inventive process, the exhaust gas stream periodically alternates between lean and rich phases, and preferably between λ values ranging from 0.50 to 2.3, more preferably from 0.75 to 2.1, more preferably from 0.85 to 2.0, more preferably from 0.90 to 1.95, more preferably from 0.93 to 1.9, more preferably from 0.96 to 1.9, and even more preferably from 0.97 to 1.9.

Finally, the present invention also relates to the use of the inventive catalyst as three-way catalyst, in particular for the treatment of automotive exhaust gas, more preferably for the treatment of gasoline engine exhaust gas, and even more preferably for the treatment of exhaust gas from a gasoline direct injection engine which periodically alternates between lean and rich phases. In particular it is preferred to use the inventive catalyst for the treatment of automotive exhaust gas wherein said exhaust gas preferably alternates between λ values ranging from 0.50 to 2.3, more preferably from 0.75 to 2.1, more preferably from 0.85 to 2.0, more preferably from 0.90 to 1.95, more preferably from 0.93 to 1.9, more preferably from 0.96 to 1.9, and even more preferably from 0.97 to 1.9.

The present invention includes the following embodiments, wherein these include the specific combinations of embodiments as indicated by the respective interdependencies defined therein:

1. A catalyst comprising a substrate and a catalyst coating, the catalyst coating comprising two or more layers, said layers comprising:
   (a) a first layer provided on the substrate, said first layer comprising Pd and Rh; and
   (b) a second layer provided on the first layer, said second layer comprising Pt and/or Pd, preferably Pt and Pd;
   the first and second layers each further comprising:
      one or more particulate support materials, wherein preferably at least part of the one or more platinum group metals is supported on the one or more particulate support materials;
      one or more oxygen storage component (OSC) materials; and
      one or more nitrogen oxide storage materials comprising one or more elements selected from the group of alkali and/or alkaline earth metals,
   wherein the total amount of alkali and alkaline earth metals comprised in the one or more nitrogen oxide storage materials contained in the catalyst ranges from 0.18 to 2.0 g/in$^3$ calculated as the respective alkali metal oxides M$_2$O and alkaline earth metal oxides MO, preferably from 0.2 to 1.5 g/in$^3$, more preferably from 0.3 to 1.0 g/in$^3$, more preferably from 0.4 to 0.8 g/in$^3$, more preferably from 0.45 to 0.6 g/in$^3$, and even more preferably from 0.5 to 0.55 g/in$^3$.

2. The catalyst of embodiment 1, wherein Pd and Rh comprised in the first layer are at least in part supported on separate particulate support materials, and preferably, wherein Pd and Rh are supported on separate particulate support materials.

3. The catalyst of embodiment 1 or 2, wherein the second layer contains less than 500 ppm of Ba, and preferably less than 500 ppm of nitrogen oxide storage material.

4. The catalyst of any of embodiments 1 to 3, wherein the one or more particulate support materials comprise metal oxide support particles, said metal oxide support particles preferably comprising at least one compound selected from the group consisting of alumina, titania, titania-alumina, zirconia-alumina, baria-alumina, ceria-alumina, baria-ceria-alumina, lanthana-alumina, lanthana-zirconia-alumina, titania-zirconia, and mixtures thereof, more preferably at least one compound selected from the group consisting of alumina, zirconia-alumina, lanthana-alumina, lanthana-zirconia-alumina, and mixtures thereof, more preferably at least one compound selected from the group consisting of zirconia-alumina, lanthana-alumina, lanthana-zirconia-alumina, and mixtures thereof, wherein even more preferably the one or more particulate support materials comprise lanthana-zirconia-alumina.

5. The catalyst of any of embodiments 1 to 4, wherein the one or more OSC materials contained in the catalyst comprise one or more compounds selected from the group consisting of zirconia, ceria, lanthana, praseodymia, neodymia, and mixtures thereof, wherein the one or more OSC materials preferably comprise ceria and/or zirconia, and more preferably a ceria-zirconia composite and/or mixed oxide.

6. The catalyst of any of embodiments 1 to 5, wherein the alkaline and/or alkaline earth metals contained in the catalyst are selected from the group consisting of Li, Na, K, Rb, Cs, Mg, Ca, Sr, and Ba, preferably from the group consisting of K, Mg, Sr, and Ba, wherein more preferably the one or more nitrogen oxide storage materials comprise Ba.

7. The catalyst of any of embodiments 1 to 6, wherein the alkaline and/or alkaline earth metals contained in the catalyst are comprised in the one or more oxygen storage materials as their respective carbonates and/or oxides.

8. The catalyst of any of embodiments 1 to 7, wherein the catalyst coating comprises Pt and Pd in a Pt:Pd weight ratio comprised in the range of from 1:100 to 10:1, more preferably of from 1:70 to 5:1, more preferably of from 1:50 to 2:1, more preferably of from 1:30 to 1:1, more preferably of from 1:20 to 1:2, more preferably of from 1:15 to 1:5, and even more preferably of from 1:13 to 1:10.

9. The catalyst of any of embodiments 1 to 8, wherein the catalyst comprises Rh in a loading of from 0.1 to 10 g/ft$^3$, preferable of from 0.5 to 5 g/ft$^3$, more preferably of from 0.75 to 4 g/ft$^3$, more preferably of from 1.0 to 3.5 g/ft$^3$, more preferably of from 1.25 to 3 g/ft$^3$, and even more preferably of from 1.5 to 2.5 g/ft$^3$.

10. The catalyst of any of embodiments 1 to 9, wherein the catalyst comprises Pt in a loading of from 0.5 to 50 g/ft$^3$, preferable of from 1 to 30 g/ft$^3$, more preferably of from 2 to 20 g/ft³, more preferably of from 3 to 15 g/ft³, more preferably of from 5 to 10 g/ft³, and even more preferably of from 7 to 9 g/ft³.

11. The catalyst of any of embodiments 1 to 10, wherein the catalyst comprises Pd in a loading of from 20 to 200 g/ft³, preferably of from 50 to 150 g/ft³, more preferably of from 80 to 110 g/ft³, and even more preferably of from 90 to 100 g/ft³.

12. The catalyst of any of embodiments 1 or 11, wherein the first layer comprises:
   (a') a layer containing Pd; and
   (a") a layer containing Rh;
   the layers (a') and (a") each further comprising:
      one or more particulate support materials, wherein preferably at least part of the platinum group metal is supported on the one or more particulate support materials;
      one or more oxygen storage component (OSC) materials; and
      one or more nitrogen oxide storage materials comprising one or more elements selected from the group of alkali and/or alkaline earth metals, and
   wherein preferably the layer (a') is provided on the substrate, and the layer (a") is provided on the layer (a').

13. The catalyst of embodiment 12, wherein the layer (a') comprises less than 500 ppm of Pt and/or Rh, preferably Pt and Rh, and preferably less than 500 ppm of further platinum group metal besides Pd,
   and/or, preferably and,
   wherein the layer (a") comprises less than 500 ppm of Pt and/or Pd, preferably Pt and Pd, and preferably less than 500 ppm of further platinum group metal besides Rh
   and/or, preferably and,
   wherein the second layer comprises less than 500 ppm of Rh, more preferably less than 500 ppm of further platinum group metal besides Pt and/or Pd, preferably Pt and Pd.

14. The catalyst of embodiment 12 or 13, wherein the one or more OSC materials comprised in layer (a') comprise a ceria-zirconia composite with 30 to 85 wt.-% $CeO_2$, preferably with 35 to 70 wt.-%, more preferably with 40 to 55 wt.-%, and even more preferably with 43 to 47 wt.-% $CeO_2$,
   and/or, preferably and,
   wherein the one or more OSC materials comprised in layer (a") and/or in the second layer, preferably in both layer (a") and in the second layer, comprise a ceria-zirconia composite with 10 to 39 wt.-% $CeO_2$, preferably with 15 to 34 wt.-%, more preferably with 20 to 32 wt.-%, and even more preferably with 25 to 30 wt.-%.

15. The catalyst of any of embodiments 12 to 14, wherein layer (a') contains 50 wt.-% or more of the one or more nitrogen oxide storage materials, preferably 70 wt.-% or more, more preferably 80 wt.-% or more, more preferably 90 wt.-% or more, more preferably 95 wt.-% or more, more preferably 98 wt.-% or more, more preferably 99 wt.-% or more, more preferably 99.9 wt.-% or more, and even more preferably wherein only layer (a') contains one or more nitrogen oxide storage materials.

16. The catalyst of any of embodiments 1 to 15, wherein the catalyst is comprised in an exhaust gas treatment system comprising an internal combustion engine and an exhaust gas conduit in fluid communication with the internal combustion engine,
   wherein the catalyst is present in the exhaust gas conduit, and
   wherein the internal combustion engine is preferably a gasoline engine.

17. The catalyst of embodiment 16, wherein the exhaust gas treatment system further contains a selective catalytic reduction (SCR) catalyst in the exhaust gas conduit, preferably a Cu-containing SCR catalyst, more preferably an SCR catalyst containing Cu and Fe, the SCR catalyst preferably being located downstream of the catalyst.

18. A method for producing a catalyst, preferably for producing a catalyst according to any one of embodiments 1 to 15, comprising the steps of:
   (i) providing a substrate;
   (ii) impregnating one or more particulate support materials with at least one Pd-source, wherein the impregnation is preferably achieved by incipient wetness;
   (iii) impregnating one or more particulate support materials with at least one Rh-source, wherein the impregnation is preferably achieved by incipient wetness;
   (iv) uniting the products obtained in steps (ii) and (iii), preferably by admixing;
   (v) adding one or more oxygen storage component (OSC) materials, one or more nitrogen oxide storage materials comprising one or more elements selected from the group of alkali and/or alkaline earth metals, and a solvent, preferably water, more preferably distilled water, to the product obtained in step (iv) to obtain a slurry, preferably by admixing the resulting mixture;
   (vi) milling the slurry obtained in step (v), preferably to a particle size $d_{90}$ of 50 μm or less, more preferably of 30 μm or less, more preferably of 20 μm or less, and even more preferably of 10 μm or less;
   (vii) providing the resulting slurry of step (vi) onto the substrate in one or more coating steps as a layer, preferably as a washcoat layer;
   (viii) impregnating one or more particulate support materials with at least one Pt- and/or at least one Pd-source, preferably with both a Pt- and a Pd-source, wherein the impregnation is preferably achieved by incipient wetness;
   (ix) adding one or more oxygen storage component (OSC) materials, one or more nitrogen oxide storage materials comprising one or more elements selected from the group of alkali and/or alkaline earth metals, and a solvent, preferably water, more preferably distilled water, to the product obtained in step (viii) to obtain a slurry, preferably by admixing the resulting mixture;
   (x) milling the slurry obtained in step (ix), preferably to a particle size $d_{90}$ of 50 μm or less, more preferably of 30 μm or less, more preferably of 20 μm or less, and even more preferably of 10 μm or less;
   (xi) providing the resulting slurry of step (x) onto the substrate in one or more coating steps as a layer, preferably as a washcoat layer;
   wherein a step of drying and/or a calcination step is preferably conducted after step (vii) and/or step (xi), more preferably a step of drying followed by a calcination step,
   wherein even more preferably a step of drying and/or a calcination step, preferably a step of drying followed by a calcination step, is conducted after each of steps (vii) and (xi),
   wherein the total amount of alkali and alkaline earth metals comprised in the one or more nitrogen oxide storage materials contained in the catalyst ranges from 0.18 to 2.0 g/in³ calculated as the respective alkali metal oxides $M_2O$ and alkaline earth metal oxides MO, preferably from 0.2 to 1.5 g/in³, more preferably from 0.3 to 1.0 g/in$^3$, more preferably from 0.4 to 0.8 g/in$^3$, more preferably from 0.45 to 0.6 g/in$^3$, and even more preferably from 0.5 to 0.55 g/in$^3$, and wherein in the resulting catalyst the layer provided in step (xi) preferably contains less than 500 ppm of Ba, and more preferably less than 500 ppm of nitrogen oxide storage material.

19. A method for producing a catalyst, preferably for producing a catalyst according to any one of embodiments 1 to 15, comprising the steps of:
   (i) providing a substrate;
   (ii) impregnating one or more particulate support materials with at least one Pd-source, wherein the impregnation is preferably achieved by incipient wetness;
   (iii) adding one or more oxygen storage component (OSC) materials, one or more nitrogen oxide storage materials comprising one or more elements selected from the group of alkali and/or alkaline earth metals, and a solvent, preferably water, more preferably distilled water, to the product obtained in step (ii) to obtain a slurry, preferably by admixing the resulting mixture;
   (iv) milling the slurry obtained in step (iii), preferably to a particle size d$_{90}$ of 50 μm or less, more preferably of 30 μm or less, more preferably of 20 μm or less, and even more preferably of 10 μm or less;
   (v) providing the resulting slurry of step (iv) onto the substrate in one or more coating steps as a layer, preferably as a washcoat layer;
   (vi) impregnating one or more particulate support materials with at least one Rh-source, wherein the impregnation is preferably achieved by incipient wetness;
   (vii) adding one or more oxygen storage component (OSC) materials, one or more nitrogen oxide storage materials comprising one or more elements selected from the group of alkali and/or alkaline earth metals, and a solvent, preferably water, more preferably distilled water, to the product obtained in step (vi) to obtain a slurry, preferably by admixing the resulting mixture;
   (viii) milling the slurry obtained in step (vii), preferably to a particle size d$_{90}$ of 50 μm or less, more preferably of 30 μm or less, more preferably of 20 μm or less, and even more preferably of 10 μm or less;
   (ix) providing the resulting slurry of step (viii) onto the substrate in one or more coating steps as a layer, preferably as a washcoat layer;
   (x) impregnating one or more particulate support materials with at least one Pt- and/or at least one Pd-source, preferably with both a Pt- and a Pd-source, wherein the impregnation is preferably achieved by incipient wetness;
   (xi) adding one or more oxygen storage component (OSC) materials, one or more nitrogen oxide storage materials comprising one or more elements selected from the group of alkali and/or alkaline earth metals, and a solvent, preferably water, more preferably distilled water, to the product obtained in step (x) to obtain a slurry, preferably by admixing the resulting mixture;
   (xii) milling the slurry obtained in step (xi), preferably to a particle size d$_{90}$ of 50 μm or less, more preferably of 30 μm or less, more preferably of 20 μm or less, and even more preferably of 10 μm or less;
   (xiii) providing the resulting slurry of step (xii) onto the substrate in one or more coating steps as a layer, preferably as a washcoat layer;
   wherein a step of drying and/or a calcination step is preferably conducted after step (v) and/or step (ix) and/or step (xiii), more preferably a step of drying followed by a calcination step, wherein even more preferably a step of drying and/or a calcination step, preferably a step of drying followed by a calcination step, is conducted after each of steps (v), (ix), and (xiii),
   wherein the total amount of alkali and alkaline earth metals comprised in the one or more nitrogen oxide storage materials contained in the catalyst ranges from 0.18 to 2.0 g/in$^3$ calculated as the respective alkali metal oxides M$_2$O and alkaline earth metal oxides MO, preferably from 0.2 to 1.5 g/in$^3$, more preferably from 0.3 to 1.0 g/in$^3$, more preferably from 0.4 to 0.8 g/in$^3$, more preferably from 0.45 to 0.6 g/in$^3$, and even more preferably from 0.5 to 0.55 g/in$^3$, and
   wherein in the resulting catalyst the layer provided in step (xiii) preferably contains less than 500 ppm of Ba, and more preferably less than 500 ppm of nitrogen oxide storage material, wherein even more preferably the resulting catalyst layers provided in steps (ix) and (xiii) preferably contain less than 500 ppm of Ba, and more preferably less than 500 ppm of nitrogen oxide storage material.

20. A process for the treatment of a gas stream comprising conducting said gas stream over and/or through a catalyst according to any one of embodiments 1 to 17, wherein the gas stream is preferably an exhaust gas stream resulting from an internal combustion engine, and more preferably from a gasoline engine,
wherein the exhaust gas stream preferably periodically alternates between lean and rich phases, preferably between λ values ranging from 0.50 to 2.3, more preferably from 0.75 to 2.1, more preferably from 0.85 to 2.0, more preferably from 0.90 to 1.95, more preferably from 0.93 to 1.9, more preferably from 0.96 to 1.9, and even more preferably from 0.97 to 1.9.

21. Use of a catalyst according to any one of embodiments 1 to 17, or of a catalyst obtained and/or obtainable according to embodiment 18 or 19, as a three-way catalyst, preferably for the treatment of automotive exhaust gas, more preferably for the treatment of gasoline engine exhaust gas, and even more preferably for the treatment of exhaust gas from a gasoline direct injection engine which periodically alternates between lean and rich phases, preferably between λ values ranging from 0.50 to 2.3, more preferably from 0.75 to 2.1, more preferably from 0.85 to 2.0, more preferably from 0.90 to 1.95, more preferably from 0.93 to 1.9, more preferably from 0.96 to 1.9, and even more preferably from 0.97 to 1.9.

EXAMPLES

Example 1

Inner Layer

Figure 1:
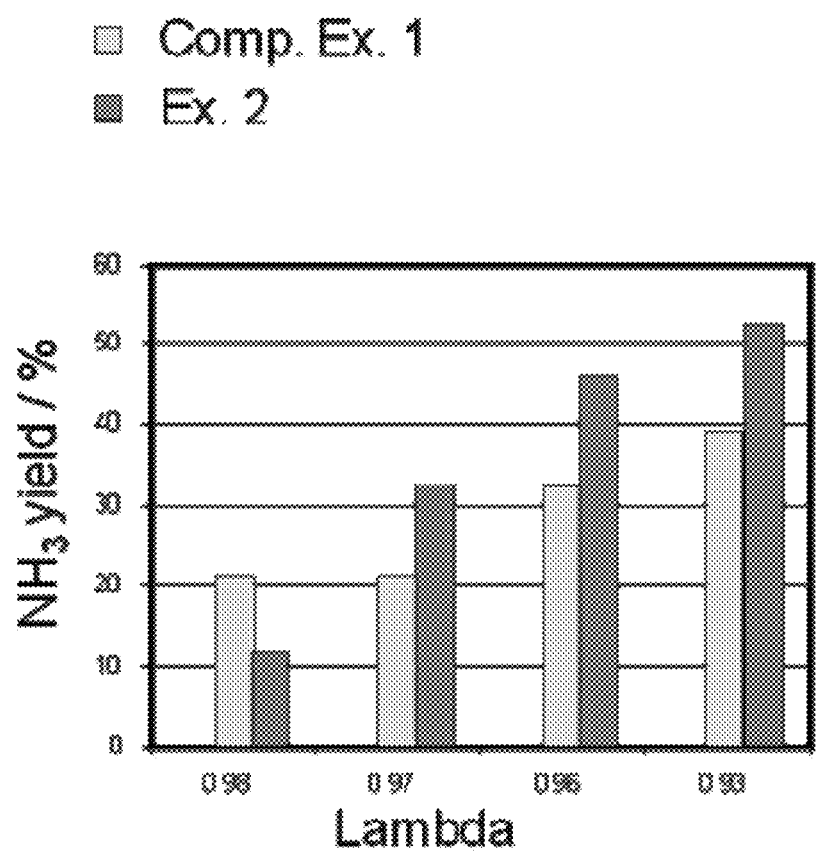
FIG. 1 displays the results from testing of the catalyst of example 2 and of comparative example 1 with respect to NH$_3$-formation activity, wherein NH$_3$-formation was measured with a secondary ionization mass spectrometer (Twin MS from Villinger & Federer). The results were obtained from testing at a catalyst bed temperature of 300° C. and lean lambda of 1.9 for rich lambda excursions of 0.93, 0.96, 0.97, and 0.98, respectively. The values of "NH$_3$ yield/%" indicates the respective yield of NH$_3$ in % during rich engine operation.

Palladium in the form of a palladium nitrate solution was impregnated by planetary mixer (P-mixer) onto a high surface area gamma alumina doped with 4% of lanthanum to form a wet powder while achieving incipient wetness. The amount of Pd was chosen to achieve a final concentration of 85.5 g/ft³ of Pd in the catalyst layer.

An aqueous slurry was then formed with water by combining the Pd loaded high surface area gamma alumina, a ceria-zirconia composite with 45% $CeO_2$, 2% $Pr_6O_{11}$, 8% $La_2O_3$, and 45% $ZrO_2$ by weight, zirconium oxide, barium oxide, and a binder, at concentrations of approximately 67%, 18%, 3%, 6% and 3%, respectively, based on the calcined weight of the catalyst. The zirconium oxide was introduced as an acetate colloidal solution and the barium oxide as barium acetate solution. The resulting slurry was then milled to a particle size of 90% less than 10 microns.

The slurry was then coated onto a cordierite carrier to provide a first washcoat layer as the inner layer thereon, wherein the cordierite substrate had a volume of 51.2 in³ (0.84 L), a cell density of 600 cells per square inch, and a wall thickness of approximately 100 μm. After coating, the carrier with the inner layer was dried, and then calcined at a temperature of 550° C. for 1 hour. The total loading of the inner layer was 1.65 g/in³.

(Middle Layer)

Rhodium in the form of a rhodium nitrate solution was impregnated by planetary mixer (P-mixer) onto a high surface area gamma alumina doped with 4% of lanthanum to form a wet powder while achieving incipient wetness. The amount of Rh was chosen to achieve a final concentration of 2 g/ft³ of Rh in the catalyst layer.

An aqueous slurry was then formed with water by combining the Rh loaded high surface area gamma alumina, a ceria-zirconia composite with 28% $CeO_2$, 7% $Pr_6O_{11}$, 7% $Nd_2O_3$, 58% $ZrO_2$ by weight, zirconium oxide, and barium oxide at concentrations of approximately 49%, 49%, 2.4%, and 2.4%, respectively, based on the calcined weight of the catalyst. The barium oxide was introduced as barium acetate solution. The resulting slurry was then milled to a particle size of 90% less than 10 microns.

The slurry was then coated onto the inner layer to provide a second washcoat layer as the middle layer thereon. After coating, the carrier with the inner and middle layers was dried, and then calcined at a temperature of 550° C. for 1 hour. The total loading of the middle layer was 1.1 g/in³.

(Outer Layer)

Platinum in the form of a platinum tetra methyl ammonium hydroxide complex solution was impregnated by planetary mixer (P-mixer) and subsequently palladium in the form of a palladium nitrate solution was impregnated onto high surface area gamma alumina doped with 20% zirconia to form a wet powder while achieving incipient wetness. The amounts of Pt and Pd where chosen to achieve a final concentration of 8 g/ft³ of Pt and 9.5 g/ft³ of Pd in the catalyst layer.

An aqueous slurry was formed with water by combining the Pt and Pd loaded high surface area gamma alumina, zirconium oxide, and a binder, at concentrations of approximately 97%, 1.6% and 1.6%, respectively, based on the calcined weight of the catalyst. The zirconium oxide was introduced as an acetate colloidal solution and the barium oxide as barium acetate solution. The resulting slurry was then milled to a particle size of 90% less than 10 microns.

The slurry was then coated onto the middle layer to provide a third washcoat layer as the outer layer of the catalyst. After coating, the carrier with the inner, middle and outer layers was dried, and then calcined at a temperature of 550° C. for 1 hour. The total loading of the outer layer was 1.6 g/in³.

Example 2

The catalyst of example 2 was produced according to the procedure of example 1, wherein for producing the outer layer high surface area gamma alumina doped with 20% zirconia was loaded with Pt and Pd to achieve a final concentration of 8 g/ft³ of Pt and 9.5 g/ft³ of Pd in the outer catalyst layer. The components present in the outer layer were Pt and Pd loaded on high surface gamma alumina, a ceria-zirconia composite with 28% $CeO_2$, 7% $Pr_6O_{11}$, 7% $Nd_2O_3$, 58% $ZrO_2$ by weight, zirconium oxide, and a binder, at concentrations of approximately 65%, 32%, 1.6% and 1.6%, respectively, based on the calcined weight of the catalyst. The total loading of the outer layer was 1.6 g/in³.

Comparative Example 1

Inner Layer

An aqueous slurry was formed with water by combining high surface area gamma alumina, a ceria-zirconia composite with 28% $CeO_2$, 7% $Pr_6O_{11}$, 7% $Nd_2O_3$, 58% $ZrO_2$ by weight, zirconium oxide, and a binder, at concentrations of approximately 23%, 70%, 0.5%, and 0.3%, based on the calcined weight of the catalyst. The zirconium oxide was introduced as an acetate colloidal solution. The resulting slurry was then milled to a particle size of 90% less than 10 microns.

The slurry was then coated onto a cordierite carrier to provide a first washcoat layer as the inner layer thereon, wherein the cordierite substrate had a volume of 51.2 in³ (0.84 L), a cell density of 600 cells per square inch, and a wall thickness of approximately 100 μm. After coating, the carrier with the inner layer was dried, and then calcined at a temperature of 550° C. for 1 hour. The total loading of the inner layer was 1.08 g/in³.

(Middle Layer)

Palladium in the form of a palladium nitrate solution was impregnated by planetary mixer (P-mixer) onto a high surface area gamma alumina doped with 4% of lanthanum to form a wet powder while achieving incipient wetness. The amount of Rh was chosen to achieve a final concentration of 95 g/ft³ of Pd in the catalyst layer.

An aqueous slurry was then formed with water by combining the Rh loaded high surface area gamma alumina, a ceria-zirconia composite with 28% $CeO_2$, 7% $Pr_6O_{11}$, 7% $Nd_2O_3$, 58% $ZrO_2$ by weight, and barium oxide at concentrations of approximately 59%, 36%, and 5%, respectively, based on the calcined weight of the catalyst. The barium oxide was introduced as barium acetate solution. The resulting slurry was then milled to a particle size of 90% less than 10 microns.

The slurry was then coated onto the inner layer to provide a second washcoat layer as the middle layer thereon. After coating, the carrier with the inner and middle layers was dried, and then calcined at a temperature of 550° C. for 1 hour. The total loading of the middle layer was 2.05 g/in³.

(Outer Layer)

Rhodium in the form of a rhodium nitrate solution was impregnated by planetary mixer (P-mixer) and subsequently platinum in the form of platinum tetra methyl ammonium hydroxide complex solution was impregnated onto high surface area gamma alumina to form a wet powder while achieving incipient wetness. The amounts of Rh and Pt where chosen to achieve a final concentration of 2 g/ft³ of Rh and 8 g/ft³ of Pt in the catalyst layer.

An aqueous slurry was formed with water by combining the Rh and Pt loaded high surface area gamma alumina, a ceria-zirconia composite with 28% $CeO_2$, 7% $Pr_6O_{11}$, 7% $Nd_2O_3$, 58% $ZrO_2$ by weight, zirconium oxide, barium oxide, and a binder, at concentrations of approximately 78%, 16%, 3%, 3%, and 3%, respectively, based on the calcined weight of the catalyst. The zirconium oxide was introduced as an acetate colloidal solution and the barium oxide as barium acetate solution. The resulting slurry was then milled to a particle size of 90% less than 10 microns.

The slurry was then coated onto the middle layer to provide a third washcoat layer as the outer layer of the catalyst. After coating, the carrier with the inner, middle and outer layers was dried, and then calcined at a temperature of 550° C. for 1 hour. The total loading of the outer layer was 1.6 g/in³.

Comparative Example 2

The catalyst of comparative example 2 was produced according to the procedure of comparative example 1, wherein for producing the middle layer high surface area gamma alumina doped with 4% of lanthanum was loaded with Pd to achieve a final concentration of 102 g/ft³ of Pd in the middle catalyst layer. For producing the outer layer, high surface area gamma alumina was loaded with Rh to achieve a final concentration of 6 g/ft³ of Rh in the outer catalyst layer.

Test Description $NH_3$ Formation and HC Oxidation:

Hydrocarbon oxidation and $NH_3$ formation efficiencies of the catalysts obtained from examples 1 and 2 and from comparative examples 1 and 2 were tested according to the following procedures.

A six cylinder lean burn gasoline engine was set to operate at 3000 rpm to produce an exhaust gas with a temperature of 500° C. at the outlet. The air fuel ratio of engine was set to correspond to a lambda value of two. The catalyst bed temperature is 450° C. at these conditions. The engine was operated at these conditions for 60 seconds and subsequently switched to an air fuel ratio corresponding to a lambda of 0.98. This cycle was repeated for 14 times. Subsequently the engine load was reduced to reduce the exhaust gas temperature by about 50° C. and the 14 cycles with alternation lambda were repeated. This was repeated until an exhaust gas temperature of ~200° C. was achieved.

$NH_3$-formation was measured with a secondary ionization mass spectrometer (Twin MS from Villinger & Federer). The $NH_3$ yield in % during rich engine operation was evaluated as follows:

$$A_{NH3} = \frac{\left(\sum NH_3^{massoutlet}/17\right)}{\left(\sum NO_x^{massinlet}/46\right)} \cdot 100$$

The total hydrocarbon concentration was measured before and after the catalyst using a state of the art flame ionization detector. The amount of total hydrocarbons (THC) oxidized to $CO_2$ in percent was calculated as follows:

$$U_{THC} = \left(1 - \left(\frac{THC^{massoutlet}}{THC^{massinlet}}\right)\right) \cdot 100$$

In another test procedure, the temperature and lean lambda was kept constant at ~300° C. and the rich lambda was varied.

Figure 2:
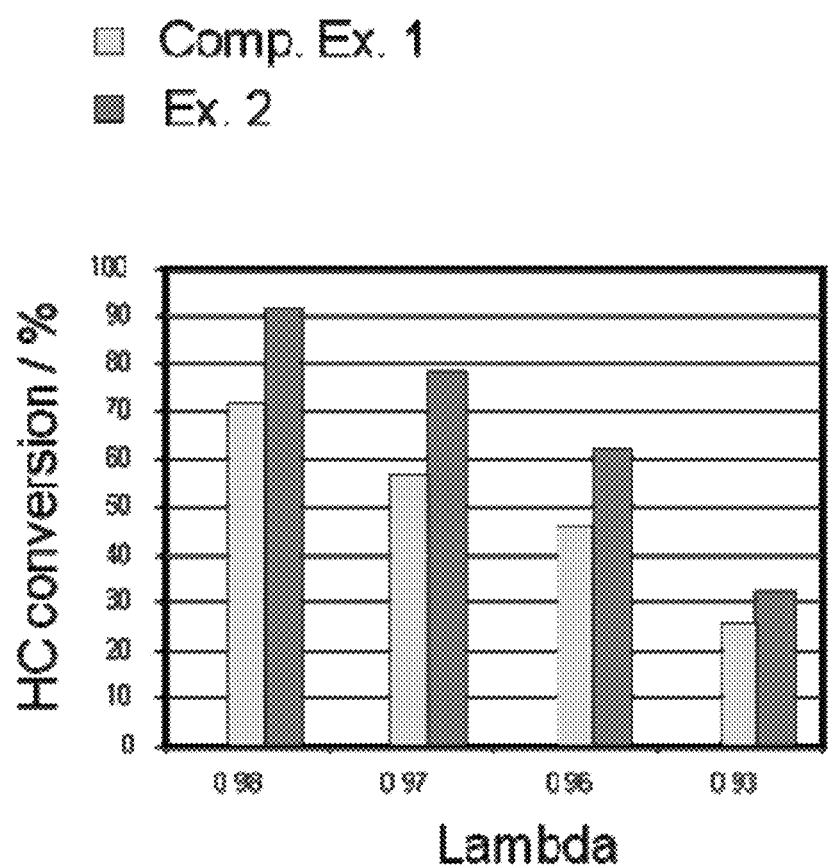
FIG. 2 displays the results from testing of the catalyst of example 2 and of comparative example 1 with respect to the conversion of hydrocarbons emissions contained in automotive exhaust gas using a flame ionization detector. As for FIG. 1, the results were obtained from testing at a catalyst bed temperature of 300° C. and lean lambda of 1.9 for rich lambda excursions of 0.93, 0.96, 0.97, and 0.98, respectively. The values of "HC conversion/%" indicate the percentage of the hydrocarbons originally contained in the automotive exhaust gas which have been converted after the exhaust has passed the catalyst according to said examples.

FIGS. 1 and 2 display the results from catalyst testing at a bed temperature of 300° C. and lean lambda of 1.9 for rich lambda excursions of 0.93, 0.96, 0.97, and 0.98, respectively. As may be taken from the testing data, compared to comparative example 1, the catalyst sample obtained from example 2 displays a clearly superior $NH_3$-formation at rich lambda values of 0.93, 0.96, and 0.97 (cf. FIG. 1). Regarding HC conversion efficiency, it may be taken from FIG. 2, that the inventive catalyst of example 2 is clearly superior to comparative example 1 at all rich Lambda values which were tested.

Figure 3:
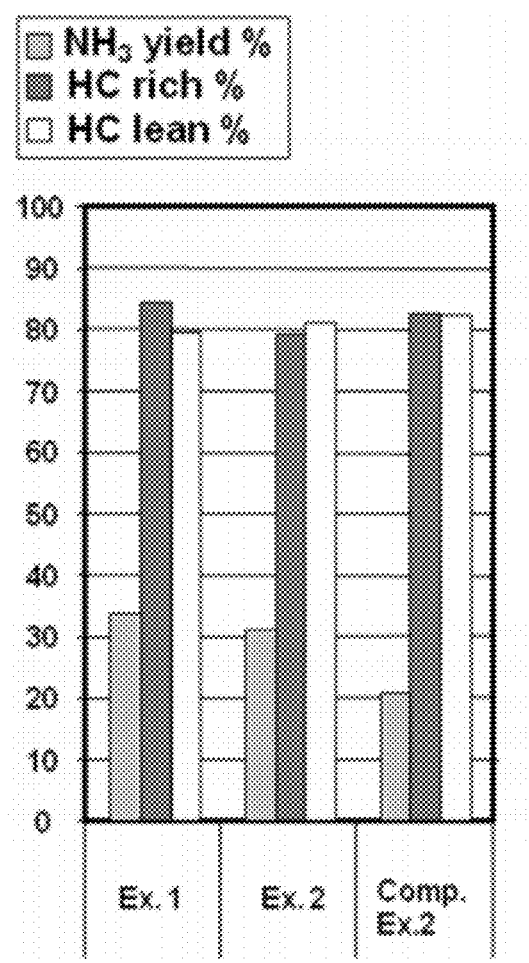
FIG. 3 displays the results from testing of the catalyst of examples 1 and 2 and of comparative example 2 with respect to both the $NH_3$-formation activity and the conversion of hydrocarbon emissions contained in automotive exhaust gas. The results were obtained from testing at a catalyst bed temperature of 300° C. and lean lambda of 1.9. The values of "$NH_3$ yield/%" indicate the respective yield of $NH_3$ in during rich engine operation. The values of "HC rich %" and "HC lean %" respectively indicate the percentage of the hydrocarbons originally contained in the automotive exhaust gas which have been converted after the exhaust has passed the catalyst according to said examples, wherein "HC lean" indicates the hydrocarbon conversion during lean lambda of 1.9 and "HC rich" indicates the average hydrocarbon conversion during rich lambda excursions of 0.93, 0.96, 0.97, and 0.98.

FIG. 3 on the other hand displays the average performance of the inventive catalysts compared to comparative example 2, wherein testing was performed at a bed temperature of 350° C. As may be taken from the testing results, both the inventive samples obtained from examples 1 and 2 and the sample from comparative example 2 display comparable activities with respect to HC conversion at both lean and rich lambda values. However, the average $NH_3$-yield obtained using the inventive catalysts clearly surpasses the average $NH_3$-yield achieved using the catalyst sample from comparative example 2.

Accordingly, as has been displayed in comparative testing experiments, the inventive catalysts display a greatly improved $NH_3$-formation activity when used in exhaust gas treatment with alternating rich and lean phases, yet while simultaneously providing a high oxidation activity with respect to the conversion of the hydrocarbon fraction. Thus, a catalyst is provided according to the present invention which may provide an outstanding $NH_3$-yield without jeopardizing the catalyst's capacity to treat hydrocarbon emission at both lean and rich phases of exhaust gas emission.

The invention claimed is:

1. A catalyst comprising a substrate and a catalyst coating, the catalyst coating comprising two or more layers, said layers comprising:
   (a) a first layer provided on the substrate, said first layer comprising:
       (a') a layer containing Pd; and
       (a") a layer containing Rh; and
   (b) a second layer provided on the first layer, said second layer comprising Pt and Pd;

the layers (a'), (a") and second layers each further comprising:
- one or more particulate support materials;
- one or more oxygen storage component (OSC) materials; and
- one or more nitrogen oxide storage materials comprising one or more elements selected from the group of alkali metals, alkaline earth metals and combinations thereof, wherein the total amount of alkali and alkaline earth metals comprised in the one or more nitrogen oxide storage materials contained in the catalyst ranges from 0.18 to 2.0 g/in$^3$ calculated as the respective alkali metal oxides M$_2$O and alkaline earth metal oxides MO, wherein the layer (a') comprises less than 500 ppm of Pt and Rh, wherein the layer (a") comprises less than 500 ppm of Pt and Pd, and wherein the second layer comprises less than 500 ppm of Rh.

2. The catalyst of claim 1, wherein at least part of the Pd, Rh and Pt is supported on the one or more particulate support materials.

3. The catalyst of claim 1, wherein Pd and Rh comprised in the first layer are at least in part supported on separate particulate support materials.

4. The catalyst of claim 1, wherein the second layer contains less than 500 ppm of Ba.

5. The catalyst of claim 1, wherein the one or more particulate support materials comprise metal oxide support particles.

6. The catalyst of claim 1, wherein the one or more OSC materials contained in the catalyst comprise one or more compounds selected from the group consisting of zirconia, ceria, lanthana, praseodymia, neodymia, and mixtures thereof.

7. The catalyst of claim 1, wherein the alkali metals, alkaline earth metals or combinations thereof contained in the catalyst are selected from the group consisting of Li, Na, K, Rb, Cs, Mg, Ca, Sr, and Ba.

8. The catalyst of claim 1, wherein the alkali metals, alkaline earth metals or combinations thereof contained in the catalyst are comprised in the one or more oxygen storage materials as their respective carbonates, oxides or combinations thereof.

9. The catalyst of claim 1, wherein the catalyst coating comprises Pt and Pd in a Pt:Pd weight ratio comprised in the range of from 1:100 to 10:1.

10. The catalyst of claim 1, wherein the catalyst comprises Rh in a loading of from 0.1 to 10 g/ft$^3$.

11. The catalyst of claim 1, wherein the catalyst comprises Pt in a loading of from 0.5 to 50 g/ft$^3$.

12. The catalyst of claim 1, wherein the catalyst comprises Pd in a loading of from 20 to 200 g/ft$^3$.

13. The catalyst of claim 1, wherein the one or more OSC materials comprised in layer (a') comprise a ceria-zirconia composite with 30 to 85 wt.-% CeO$_2$, or, wherein the one or more OSC materials comprised in layer (a") or in the second layer or both comprise a ceria-zirconia composite with 10 to 39 wt.-% CeO$_2$.

14. The catalyst of claim 1, wherein layer (a') contains 50 wt.-% or more of the one or more nitrogen oxide storage materials.

15. An exhaust gas treatment system comprising an internal combustion engine and an exhaust gas conduit in fluid communication with the internal combustion engine, wherein the catalyst according to claim 1 is present in the exhaust gas conduit.

16. The exhaust gas treatment system of claim 15, wherein the exhaust gas treatment system further contains a selective catalytic reduction (SCR) catalyst in the exhaust gas conduit.

17. A method for producing a catalyst according to claim 1, comprising the steps of:
- (i) providing a substrate;
- (ii) impregnating one or more particulate support materials with at least one Pd-source;
- (iii) adding one or more oxygen storage component (OSC) materials, one or more nitrogen oxide storage materials comprising one or more elements selected from the group of alkali metals, alkaline earth metals and combinations thereof, and a solvent to the product obtained in step (ii) to obtain a slurry;
- (iv) milling the slurry obtained in step (iii);
- (v) providing the resulting slurry of step (iv) onto the substrate in one or more coating steps as a layer;
- (vi) impregnating one or more particulate support materials with at least one Rh-source;
- (vii) adding one or more oxygen storage component (OSC) materials, one or more nitrogen oxide storage materials comprising one or more elements selected from the group of alkali metals, alkaline earth metals and combinations thereof, and a solvent to the product obtained in step (vi) to obtain a slurry;
- (viii) milling the slurry obtained in step (vii);
- (ix) providing the resulting slurry of step (viii) onto the substrate in one or more coating steps as a layer;
- (x) impregnating one or more particulate support materials with at least one Pt- and at least one Pd-source;
- (xi) adding one or more oxygen storage component (OSC) materials, one or more nitrogen oxide storage materials comprising one or more elements selected from the group of alkali metals, alkaline earth metals and combinations thereof, and a solvent to the product obtained in step (x) to obtain a slurry;
- (xii) milling the slurry obtained in step (xi);
- (xiii) providing the resulting slurry of step (xii) onto the substrate in one or more coating steps as a layer;

wherein the total amount of alkali and alkaline earth metals comprised in the one or more nitrogen oxide storage materials contained in the catalyst ranges from 0.18 to 2.0 g/in$^3$ calculated as the respective alkali metal oxides M$_2$O and alkaline earth metal oxides MO.

18. A process for the treatment of a gas stream comprising conducting said gas stream over or through a catalyst according to claim 1.

19. A method comprising a step of contacting an exhaust gas comprising CO, unburned hydrocarbons, and nitrogen oxides with a catalyst according to claim 1 for conversion of said compounds to CO$_2$, N$_2$, and water.

* * * * *